United States Patent Office 3,119,801
Patented Jan. 28, 1964

3,119,801
RECOVERY OF OLEFIN POLYMERS FROM SOLUTION
Donald M. Haskell, Bartlesville, Okla., assignor to Phillips Petroleum Company, a corporation of Delaware
No Drawing. Filed Aug. 1, 1957, Ser. No. 675,548
11 Claims. (Cl. 260—94.9)

This invention relates to the recovery of olefin polymers from solution. In one aspect it relates to a solid polymer recovery system wherein olefin polymers are precipitated from solution by decreasing the solution temperature and by providing agitation of the solution.

As used herein, the term solid polymers includes, in addition to the normally solid materials those polymers of lower molecular weight which are tacky in nature and also semi-solid waxy type polymers.

Solid olefin polymers treated in the method of this invention are prepared by a number of methods which usually result in a product which is dissolved in a diluent or solvent material. The polymers are usually present as a mixture of compounds having molecular weights which can vary from as low as 500 to as high as 100,000. Inasmuch as the polymers are usable primarily in a solvent free condition, it is usually necessary to precipitate or otherwise remove the solid polymers from solution. Various methods have been proposed for this purpose; however, when operating in accordance with the prior methods, the polymers are usually obtained as a single product and are not segregated according to molecular weight or other properties.

It is an object of this invention to provide an improved method for the recovery of solid olefin polymers from solution.

Another object of this invention is to provide an improved method for the precipitation of olefin polymers from solution.

Yet another object of this invention is to provide an improved method for recovering olefin polymers from solution according to molecular weight.

Still another object of this invention is to provide an improved method for precipitating solid olefin polymers from solution in different physical forms and in accordance with molecular weight.

These and other objects of the invention will become more readily apparent from the following detailed description and discussion.

The foregoing objects are achieved boardly by agitating and cooling a solution of solid olefin polymers until polymers precipitate therefrom, and recovering polymers differing in physical form and molecular weight.

In one aspect of the invention agitation of the solution is carried out during the cooling operation.

In another aspect of the invention agitation of the solution is provided after the cooling of the solution is terminated.

The polymers which are treated within the scope of this invention include a wide variety of olefin polymers such as for example polymers or copolymers of monoolefins like ethylene, propylene, butylene, etc., also copolymers of monoolefins and diolefins such as butadiene, isoprene, etc. The invention is particularly applicable to polymers of 1-olefins having a maximum of 8 carbon atoms per molecule and no branching nearer the double bond than the 4-position and more particularly to polymers of ethylene which have a specific gravity of at least 0.94 at 20° C. and preferably 0.96 or higher and a crystallinity of at least 70 percent and preferably at least 80 percent at ordinary atmospheric temperatures.

A preferred polymerization method is described in detail in a copending application of Hogan and Banks, Serial No. 573,877, filed March 26, 1956, now Patent No. 2,825,721. This particular method utilizes a chromium oxide catalyst, preferably containing hexavalent chromium with silica, alumina, silica-alumina, zirconia, thoria, etc. In one embodiment of this application, olefins are polymerized in the presence of a hydrocarbon diluent, for example an aliphatic, cycloaliphatic, or, less preferably, aromatic hydrocarbon which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly trans-internal unsaturation. Polymers prepared by both methods are also characterized by their high densities and high percentage of crystallinity at normal atmospheric temperatures.

Other less advantageous procedures which employ different catalyst are also used for preparing olefin polymers. For example, polymers are prepared in the presence of organometallic compounds such as triethylaluminum plus titanium tetrachloride, mixtures of ethyl aluminum halides with titanium tetrachloride, and the like, Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is usually maintained at a sufficient level to assure a liquid phase reaction, that is, at least about 100 to 300 p.s.i.g., depending upon the type of feed material and the polymerization temperature. Higher pressures up to 500 to 700 p.s.i.g. or higher can be used, if desired. If it is desired to carry out the process in the vapor state, much lower pressures, down to atmospheric, can be employed. When utilizing a fixed bed, the space velocity varies from as low as about 0.1 to about 20 volumes of feed per volume of catalyst, with the preferred range being between about 1 and about 6 volumes per volume per hour. When operating with a mobile catalyst, it is desirable to maintain the catalyst concentration in the reaction zone between about 0.01 and about 10 percent by weight. Residence time can be from 10 minutes or less to 10 hours or more.

The use of a diluent in the polymerization reaction, in general, serves two purposes. Since the reactions are usually exothermic in nature, the presence of a quantity of diluent provides a method for obtaining close control of the reaction temperature. In addition, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic paraffins having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents are not normally used because they (or impurities therein) tend to shorten the catalyst life; however, if catalyst life is not an important factor in the process, solvents of an aromatic nature can also be employed. All of the foregoing and in addition, other hydrocarbon diluents which are relatively inert, non-deleterious, and in the liquid state at the reaction conditions, can also be employed in carrying out the reaction of olefins to form solid polymers.

In a preferred embodiment, the invention is directed to the precipitation and recovery from solution of polymers of ethylene which have a density of at least 0.94 and preferably 0.96 or higher and a crystallinity of at least 70 percent and preferably at least 80 percent at normal atmospheric temperatures as determined by the method of Matthews, Peiser and Richards, Acta Cryst. 2, 85 (1949). The following procedure is followed in preparing the sample to be tested, to assure a close approach to equilibrium before the crystallinity is determined: (1) the polymer is heated to a temperature about 90° F. above the crystalline melting point; (2) this temperature is maintained for approximately one hour; and (3) the polymer is then cooled to room temperature at a rate characterized by a fall of 2.7° F. per minute at 255° F. The preceding treatment is carried out in an environment essentially free of oxygen. It has been found that these polymers are particularly suited to treatment by the method disclosed herein. While the treatment of these polymers provides a preferred embodiment of the invention, other polymers as related above are also treated and it is not intended that the scope of the invention be limited to the treatment of any particular polymer or polymers.

In carrying out the invention in one embodiment thereof, effluent from a polymerization reaction comprising a mixture of olefin polymers and hydrocarbon solvent which has been treated for the removal of catalyst and unreacted olefin, is introduced to a cooling zone. Generally several zones are provided in parallel so that reaction effluent is continuously entering at least one zone, however, if desired, the operation can be carried out with only one cooling zone by providing surge capacity for the reaction zone effluent. After filling of the cooling zone is completed, the flow of material thereto is stopped and cooling of the solution in the zone is commenced whereby there is provided a decrease in temperature of the solution. The solubility of the olefin polymers in the solvent material is a function of temperature and as the material is cooled, the polymer begins to precipitate from solution. The cooling process is continued until the desired quantity of polymer is precipitated. It has been found that by the use of agitation in conjunction with the cooling operation, it is possible to obtain a polymer precipitate which contains two physically different types of polymer particle. One type of polymer particle is fibrous and stringy in nature and usually is of a size greater than 0.1 inch. The other type comprises smaller discrete non-fibrous particles which remain dispersed in the solvent. The latter particles, which are granular in nature, are usually less than 0.1 inch in size. In addition to differing in physical shape and size, the polymer particles also differ in various properties including, molecular weight, viscosity, density, impact strength and crystallinity. Thus, for example, the fibrous product has a higher molecular weight than the small non-fibrous particle polymer but a lower crystallinity.

The operating temperature range in the cooling zone is determined by the temperature at which the polymers precipitate from solution. This in turn is a function of the molecular weight range of the polymers and the specific solvent or diluent used. For example with ethylene polymers having average molecular weights of between about 15,000 and 25,000, it has been found that a substantial portion of the polymers will precipitate from isooctane at about 180° F. and from cyclohexane at about 165° F. When heavier polymers, for example, ethylene polymers having a molecular weight between about 25,000 and about 45,000 are treated substantial precipitation takes place from cyclohexane at about 170° F. In general, it is desirable that the concentration of polymer in the diluent entering the cooling zone be maintained at a low level usually between about 1 and about 15 percent by weight and preferably between about 3 and about 5 percent by weight. The rate of cooling employed can vary over a relatively wide range from as low as 1 or 2 degrees a minute to as high as 20 degrees per minute. It is not necessary that the cooling rate be uniform, therefore the rate of temperature decrease can vary throughout the cooling cycle.

When treating the polymer as described, it is desirable to remove by precipitation a major portion of the polymer which is contained in solution. Usually the precipitated polymer comprises at least 90 to 98 percent by weight of the polymer introduced to the cooling zone, however, it is within the scope of the invention to retain in solution larger quantities of polymer and the material which remains dissolved in the diluent leaving the cooling zone may amount to as high as 15 to 25 percent or higher of the polymer introduced to this zone.

A number of methods are available for providing the cooling required for carrying out the invention. For example, indirect heat exchange can be employed, such as, by the use of cooling coils disposed within the cooling zone containing a circulating refrigerant, by the use of a double-wall cooling zone containing a circulating cooling agent, etc. Direct cooling methods can also be used. These include injection of cold diluent into the cooling zone, cooling by auto refrigeration, etc.

Agitation of the polymer solution is an important factor in determining the quantity of the various polymer products obtained and the physical characteristics of these products. For example, it has been found that the duration of the agitation has an important effect on the quantity of fibrous high molecular weight polymer produced. Thus, with short periods of agitation, only a small amount of fibrous polymer is obtained and as the time of agitation is increased, the amount of this material increases. By appropriately controlling the agitation time, it is possible to obtan a product contaning from a few percent to as high as 80 to 90 percent of fibrous high molecular weight polymer. In addition to the time of agitation, it has also been found that the polymer product distribution is effected by employing agitation during different portions of the cooling and precipitation cycle. Thus, it has been found that if agitaton is carred out durng the first portion of the cooling and precipitation cycle, a high percentage of the polymer is precipitated as fibrous high molecular weight material; on the other hand agitation during the latter portions of the cycle produces smaller quantities of high molecular weight polymer. For example, in the case of ethylene polymers dissolved in cyclohexane, the quantity of fibrous polymer is a maximum when agitation is provided at between about 190 and about 155° F., and preferably between 190 and about 170° F. In general, the two types of polymer can be obtained, in varying proportions, by agitating throughout the cooling and precipitation cycle or any portion thereof or by first providing cooling (and precipitation) to a given temperature and thereafter agitating without additional cooling. Agitation within the scope of the invention, is provided mechanically, such as by the use of a stirrer, agitator, mixing pump, or the like.

Following the cooling and precipitation cycle the cooling zone is emptied and the contents are passed through a separation step to separate the different polymer products. The separation of the solid phases can be effected in a number of ways. For example, screens of suitable sizes can be used in series. Also, in some cases, where the cooled solution is agitated by a stirrer, higher molecular weight particles collect as a fibrous mass on the stirrer. Thus, the stirrer by suitable modification can be used as a means for a periodic or continuous removal of the fibrous higher molecular weight polymer product. The solvent can be removed from the polymer products by various methods such as centrifugation, filtration, etc., and can be recycled to the polymerization process if desired.

The following examples are presented in illustration of the invention in its various aspects.

PREPARATION OF ETHYLENE POLYMERS

Ethylene was polymerized according to the procedure described in the Hogan and Banks application using a 150-gallon reactor. The following conditions are typical of those employed during the run:

*Reaction Conditions*

Temperature _____ 290° F.
Pressure _____ 420 p.s.i.
Catalyst concentration. 0.24% (as $CrO_3$).
Chromium on catalyst . 4.55% (total expressed as $CrO_3$).
Hexavalent chromium
  on catalyst_____ 4.50% (total expressed as $CrO_3$).
Cyclohexane solvent __ 830 lb./hr.
Ethylene _____ 69 lb./hr.

The polymer solution was filtered hot to recover the catalyst. The polymer was then recovered from the filtrate by precipitation.

PREPARATION OF ETHYLENE-PROPYLENE COPOLYMERS

Copolymers of ethylene with propylene were prepared according to the Hogan and Banks process previously described. The monomers were fed to a 64 gallon reactor at a weight ratio of about 80 parts of ethylene to 20 parts of propylene. The pertinent experimental conditions for two batches of polymer were as follows:

Temperature _____ 257° F.
Pressure _____ 300 p.s.i.
Catalyst concentration _____ 0.06%.
Chromium on catalyst _____ About 2.5% total.
Cyclohexane solvent _____ 180 lb./hr.
Polymer concentration _____ 7.9 lb./100 lb. solvent.
Ethylene feed rate _____ 22.3 lb./hr.
Propylene feed rate _____ 5.7 lb./hr.
Productivity per lb. catalyst ___ 124 lb./hr.

EXAMPLE I

To prepare the polymer solutions described in this and the other examples, an insulated steel tank (I.D.=10 inches) having a capacity of about 20 liters was used. This tank was externally lagged with electrical heaters. Thermocouples within the tank permitted measurement of temperature. The bottom of the tank was spherical and a drain valve permitted good drainage of the tank.

The tank was equipped with a motor driven stirrer having a simple 2-blade paddle. The paddle was about 6" wide and was operated at a speed of about 345 r.p.m.

Ethylene polymer (450 grams) prepared as described above and designated as sample A in Table I was dissolved in about 16 liters of cyclohexane by heating with agitation at 250° F. for one hour. The solution was then cooled without stirring to 156° F. As the solution cooled, polymer precipitated out in the form of fine particles which were generally less than about 1 millimeter in diameter. The solution was filtered while at about 156° F. and the filtercake obtained was redissolved in about 16 liters of cyclohexane by heating to 250° F. The solution was cooled while quiescent to 156° F. and filtered.

The product (sample B, Table I) obtained from the second filtration described above, was dried in a vacuum oven at 210° F. for several hours. A portion of the filtrate was also dried to obtain a sample (sample C, Table I) of the product which remained soluble at 156° F.

In another test, 450 grams of polyethylene was dissolved in cyclohexane at 250° F. The solution was cooled slowly (about 0.5° F./min.) until the temperature reached 170° F. The solution was then stirred for about 1 hour whereupon fibrous material collected on the stirrer and some fine, powdery polymer remained suspended in the solvent. The fibrous material which collected on the stirrer was removed and dried in a vacuum oven at about 210° F. to give product D of Table I. The solvent and dispersed powdery polymer was drained from the vessel and filtered. The filtercake was dried at 210° F. to obtain the sample designated as E in Table I.

The data in Table I show the effect of the fractionation process on the properties of the polymer. The results from samples B and C are considered typical of those obtained by prior art procedures. The results with samples D and E are those obtained by practice of the invention herein described. These results clearly show that upon agitation of the cooled solution, the polymer having a molecular weight (M.W.) of 49,200 was separated into a fibrous fraction having an M.W. of 63,000 and a powdery fraction of M.W. 44,000. Other physical properties are affected to varying degrees. Thus, the higher M.W. fraction has an impact strength of 12.2 as compared with a value of 4.9 for the control test. Those skilled in the art can readily see that this improvement in impact strength can be utilized, for example, in molded articles.

*Table I*
PHYSICAL PROPERTIES OF ETHYLENE POLYMER FRACTIONS

| Sample Description | | Yield, percent | Density, g./cc. | [N],[b] M.W. | Melt Index | Izod impact,[a] ft. lb./in. notch | Compression molded, tensile, p.s.i. | Compression molded, elongation, percent | Color and form |
|---|---|---|---|---|---|---|---|---|---|
| Letter | Data | | | | | | | | |
| A | Control | (100) | 0.960 | 2.01 / 49,200 | 0.651 | 4.9 | 4,368 | 20 | White solid. |
| B | Insoluble in $CyC_6$ at 156° F | 95.4 | 0.963 | 2.45 / 60,000 | 0.548 | 4.9 | 4,842 | 22 | Do. |
| C | Soluble in $CyC_6$ at 156° F | 5.6 | 0.967 | 0.94 / 23,000 | | | | | Brown Brittle solid. |
| D | Insoluble polymer which clung to stirrer at 170° F. | 74 | 0.959 | 2.59 / 63,000 | 0.340 | 12.3 | 4,235 | 12 | White stringy solid. |
| E | Insoluble powdery polymer at 170° F. | | | 1.80 / 44,000 | | | | | White powdery solid. |

[a] Samples prepared on one-ounce injection molding machine.
[b] The upper figure is the intrinsic viscosity, the lower figure is the molecular weight.

EXAMPLE II

Ethylene polymer prepared as described above was used to prepare a solution containing 450 grams of the polymer in about 16 liters of cyclohexane, as stated for Example I. As the solution cooled overnight, it was stirred continuously. The final solution temperature was about 25° C.

Two insoluble forms were obtained as previously described. The recovered fibrous fraction represented 88 percent of the polymer. The powdery product which had remained dispersed in the solvent represented about 11 percent of the polymer. About 1 percent of the product which remained dissolved in the solvent, which was lost, etc. was not accounted for.

The fibrous product gave an Izod impact strength of 5.88 as compared with 4.94 for the control (untreated) polymer. The powdery product had a density of 0.975 as compared with 0.96 for the control and had a low molecular weight as indicated by viscosity and melt index tests. Infrared analysis of the products showed differences in molecular weight and crystallinity as given in the tabulation below:

|  | Control | Fibrous Product | Powdery Product |
| --- | --- | --- | --- |
| Number average M.W. | 9,000 | 13,000 | 3,500 |
| Crystallinity | 92 | 91 | 98–100 |

EXAMPLE III

Ethylene polymer prepared as described above was used to prepare a solution containing 450 grams of the polymer in about 16 liters of cyclohexane as stated for Example I. As the solution cooled, it was not stirred until the temperature reached 170° F. Then the solution was stirred for 8 minutes before draining the vessel and separating the fibrous product from the solvent containing the dispersed, powdery product. These fractions were treated as previously described to recover the products. The fibrous product amounted to 8.1% and the powdery product to 83.5 percent of the total product. For this test, then, the fibrous product amounted to a small fraction of the total. In contrast, for Example I, the fibrous product amounted to about 74 percent of the total. This illustrates control of the relative amounts of the products by varying the time of agitation.

Test data on the products gave the following results.

| Product | Yield, percent | Density, g./cc. | Melt index | Intrinsic viscosity (N) |
| --- | --- | --- | --- | --- |
| Control | 100 | 0.960 | 0.65 | 2.01 |
| Fibrous product | 8.1 |  | 0.12 | 2.42 |
| Powdery product | 83.5 | 0.960 | 0.40 |  |
| Soluble in solvent | 8.4 |  |  | 0.36 |

EXAMPLE IV

The 80:20 ethylene-propylene copolymer prepared as described above was used for this example.

The polymer was in the cyclohexane solvent as recovered from the reactor. The mixture (5 gal.) was heated at 250° F. for one hour and then cooled with stirring. When the temperature reached 150° F. the stirring was terminated, and the system allowed to remain quiescent overnight (about 16 hr.). During this interval, the temperature dropped from 150° F. to 95° F. There were two types of solid phases as described for tests made with polyethylene. The fibrous fraction which had adhered to the stirrer gave 187 grams of dry product. The powdered product recovered by filtration of the cyclohexane, amounted to 177 grams. An aliquot of the cyclohexane filtrate was also dried to give a product. Each of these products was blended with 0.03 percent by weight of an anti-oxidant (Ionol).

The physical properties of the three products are shown in Table II together with those obtained for the untreated polymer.

Table II
FRACTIONATION OF 80:20 ETHYLENE-PROPYLENE COPOLYMER

| Product | Density, g./cc. | Melt index | Impact strength |
| --- | --- | --- | --- |
| Original polymer | 0.931 | 0.61 | 10.28 |
| Fibrous product | 0.933 | 0.12 | 9.65 |
| Powdery product | 0.928 | 2.56 | 12.2 |

Having thus described the invention by providing specific examples thereof, it is to be understood that no undue restrictions or limitations are to be drawn by reason thereof and that many variations or modifications are clearly within the scope of the invention.

I claim:

1. In a process for the removal of solid olefin polymers from hydrocarbon solution thereof by cooling to below the precipitation point the improvement comprising mechanically agitating said polymer solution containing precipitated polymer for a period of time sufficient to form polymer in a fibrous form.

2. A process for the removal of solid olefin polymers from hydrocarbon solution thereof which comprises mechanically agitating said solution containing precipitated polymer while removing heat therefrom for a period of time sufficient to form solid polymers in granular and fibrous forms and thereafter recovering a first fraction comprising said granular polymer and a second fraction comprising said fibrous polymer.

3. A process for the removal of solid olefin polymers from solution in an inert hydrocarbon solvent which comprises simultaneously mechanically agitating the solution and removing heat therefrom and precipitating solid polymers in granular and fibrous forms, said fibrous form having a higher molecular weight than said granular form, and thereafter recovering one fraction comprising said granular polymer and another fraction comprising said fibrous polymer.

4. A process for the removal of solid olefin polymers from solution in an inert hydrocarbon solvent which comprises removing heat from the solution whereby solid polymers are precipitated and thereafter mechanically agitating the solution containing said solid polymers for a period of time sufficient to obtain precipitated polymers in granular and fibrous forms, said fibrous form having a higher molecular weight than said granular form, and recovering one fraction comprising said granular polymer and another fraction comprising said fibrous polymer.

5. A process for the removal of solid polymers of ethylene having a specific gravity of at least 0.94 and a crystallinity of at least 70 percent from solution in an inert hydrocarbon solvent which comprises mechanically agitating said solution for a period of time sufficient to precipitate solid polymers in granular and fibrous forms while simultaneously removing heat from said solution, and thereafter recovering one fraction comprising said granular polymer and a second fraction comprising said fibrous polymer.

6. The process of claim 5 in which the hydrocarbon solvent is cyclohexane and the temperature of the solution is reduced from about 190° F. to about 155° F.

7. The process of claim 5 in which the hydrocarbon solvent is cyclohexane and the temperature of the solution is reduced from about 190° F. to about 170° F.

8. The process of claim 5 in which agitation of the solution is obtained by stirring and the fraction of fibrous polymer accumulates on the stirrer.

9. A process for the removal of solid polymers of ethylene having a density of at least 0.94 and a crystallinity of at least 70% from solution in an inert hydrocarbon solvent which comprises removing heat from said solvent whereby solid polymers are precipitated, thereafter mechanically agitating the solution containing said solid polymers for a period of time sufficient to obtain precipitated polymers in granular and fibrous forms, said fibrous form having a higher molecular weight than said granular form, and thereafter recovering one fraction comprising said granular polymer and another fraction comprising said fibrous polymer.

10. The process of claim 9 in which the hydrocarbon solvent is cyclohexane and the temperature of the solvent is reduced from about 190° F. to about 170° F.

11. The process of claim 9 in which agitation of the solution is obtained by stirring and the fraction of fibrous polymer accumulates on the stirrer.

References Cited in the file of this patent

UNITED STATES PATENTS

| | | |
|---|---|---|
| 2,457,238 | Hunter | Dec. 28, 1948 |
| 2,748,105 | Becker et al. | May 29, 1956 |
| 2,825,721 | Hogan | Mar. 4, 1958 |
| 2,870,113 | Jones | Jan. 20, 1959 |

FOREIGN PATENTS

| | | |
|---|---|---|
| 1,042,310 | France | June 3, 1953 |